US008429450B2

(12) United States Patent
Brown et al.

(10) Patent No.: US 8,429,450 B2
(45) Date of Patent: Apr. 23, 2013

(54) METHOD AND SYSTEM FOR COORDINATED MULTIPLE CLUSTER FAILOVER

(75) Inventors: David E. Brown, Valinda, CA (US); Scott Simpson, Foothill Ranch, CA (US)

(73) Assignee: Vision Solutions, Inc., Irvine, CA (US)

( * ) Notice: Subject to any disclaimer, the term of this patent is extended or adjusted under 35 U.S.C. 154(b) by 183 days.

(21) Appl. No.: 12/790,628

(22) Filed: May 28, 2010

(65) Prior Publication Data

US 2010/0241896 A1  Sep. 23, 2010

Related U.S. Application Data

(63) Continuation of application No. 11/732,670, filed on Apr. 4, 2007, now Pat. No. 7,757,116.

(51) Int. Cl.
*G06F 11/00* (2006.01)

(52) U.S. Cl.
USPC .......................................................... 714/13

(58) Field of Classification Search ........................ None
See application file for complete search history.

(56) References Cited

U.S. PATENT DOCUMENTS

| 5,371,852 | A | 12/1994 | Attanasio et al. |
| 5,754,781 | A | 5/1998 | Kitta |
| 5,802,293 | A | 9/1998 | van der Sijpt |
| 5,805,785 | A | 9/1998 | Dias et al. |
| 6,088,727 | A | 7/2000 | Hosokawa et al. |
| 6,178,529 | B1 | 1/2001 | Short et al. |
| 6,192,401 | B1 | 2/2001 | Modiri et al. |
| 6,243,825 | B1 | 6/2001 | Gamache et al. |
| 6,311,217 | B1 | 10/2001 | Ehlinger et al. |
| 6,360,331 | B2 | 3/2002 | Vert et al. |
| 6,370,583 | B1 | 4/2002 | Fishler et al. |
| 6,374,297 | B1 | 4/2002 | Wolf et al. |
| 6,385,643 | B1 | 5/2002 | Jacobs et al. |
| 6,389,451 | B1 | 5/2002 | Hart |
| 6,389,550 | B1 | 5/2002 | Carter |
| 6,393,485 | B1 | 5/2002 | Chao et al. |
| 6,438,705 | B1 | 8/2002 | Chao et al. |
| 6,449,734 | B1 | 9/2002 | Shrivastava et al. |
| 6,553,401 | B1 | 4/2003 | Carter et al. |
| 6,564,261 | B1 | 5/2003 | Gudjonsson et al. |
| 6,571,274 | B1 | 5/2003 | Jacobs et al. |
| 6,571,283 | B1 | 5/2003 | Smorodinsky |
| 6,578,066 | B1 | 6/2003 | Logan et al. |
| 6,609,213 | B1 | 8/2003 | Nguyen et al. |
| 6,662,229 | B2 | 12/2003 | Passman et al. |
| 6,675,199 | B1 | 1/2004 | Mohammed et al. |
| 6,675,217 | B1 | 1/2004 | Dani et al. |
| 6,691,165 | B1 | 2/2004 | Bruck et al. |
| 6,697,849 | B1 | 2/2004 | Carlson |
| 6,718,481 | B1 | 4/2004 | Fair |
| 6,725,261 | B1 | 4/2004 | Novaes et al. |

(Continued)

*Primary Examiner* — Gabriel Chu

(74) *Attorney, Agent, or Firm* — Stetina Brunda Garred & Brucker

(57) ABSTRACT

Hyperclusters are a cluster of clusters. Each cluster has associated with it one or more resource groups, and independent node failures within the clusters are handled by platform specific clustering software. The management of coordinated failovers across dependent or independent resources running on heterogeneous platforms is contemplated. A hypercluster manager running on all of the nodes in a cluster communicates with platform specific clustering software regarding any failure conditions, and utilizing a rule-based decision making system, determines actions to take on the node. A plug-in extends exit points definable in non-hypercluster clustering technologies. The failure notification is passed to other affected resource groups in the hypercluster.

7 Claims, 6 Drawing Sheets

U.S. PATENT DOCUMENTS

| | | |
|---|---|---|
| 6,732,166 B1 | 5/2004 | Woodruff |
| 6,748,381 B1 | 6/2004 | Chao et al. |
| 6,748,429 B1 | 6/2004 | Talluri et al. |
| 6,757,836 B1 | 6/2004 | Kumar et al. |
| 6,769,008 B1 | 7/2004 | Kumar et al. |
| 7,124,320 B1 | 10/2006 | Wipfel |
| 7,451,347 B2 | 11/2008 | Subbaraman et al. |
| 7,480,814 B2 | 1/2009 | Shinohara et al. |
| 2002/0010735 A1 | 1/2002 | McMillen et al. |
| 2002/0049859 A1 | 4/2002 | Bruckert et al. |
| 2002/0198996 A1 | 12/2002 | Sreenivasan et al. |
| 2003/0037134 A1 | 2/2003 | Hickman |
| 2004/0049573 A1 | 3/2004 | Olmstead et al. |
| 2004/0059830 A1 | 3/2004 | Brown |
| 2004/0083404 A1 | 4/2004 | Subramaniam et al. |
| 2004/0103166 A1 | 5/2004 | Bae et al. |

“METHOD AND SYSTEM FOR COORDINATED MULTIPLE CLUSTER FAILOVER”

CROSS-REFERENCE TO RELATED APPLICATIONS

This application is a continuation application U.S. patent application Ser. No. 11/732,670, entitled "METHOD AND SYSTEM FOR COORDINATED MULTI-CLUSTER FAILOVER" filed Apr. 4, 2007 now U.S. Pat. No. 7,757,116, the disclosure of which is wholly incorporated by reference herein.

STATEMENT RE: FEDERALLY SPONSORED RESEARCH/DEVELOPMENT

Not Applicable

BACKGROUND OF THE INVENTION

1. Technical Field

This invention generally relates to the administration of distributed data processing systems. More particularly, this invention relates to methods and systems for coordinating the use of data processing resources across multiple clusters of computers in the event of a disruption.

2. Description of Related Art

In order to be competitive, businesses must maintain continuous operations with as little interruption as possible and maximize "business uptime." Businesses rely heavily on enterprise-wide back-end computer systems to support its operations, from handling electronic mail, managing inventories, providing critical data to widely dispersed employees, to serving web pages and taking product orders from consumers in online sales. Oftentimes the components that these functions require are shared. For example, a database maintains the inventory of a company's products for internal control purposes, but it is also modified when a customer makes a purchase through a website. The same database may also be accessed by employees in the field through the company's extranet in order to retrieve sales information for strategic planning. Thus, because the functions performed by the computer system are so tightly integrated with the operations of the business, their availability is directly related to "business uptime." It is therefore critical that businesses have computer systems with high availability.

The key element of high availability computer systems is not having a single point of failure. Prior enterprise level computing solutions often utilized a single mainframe computer running all of the services required by the entire business. Despite the improved reliability of individual hardware and software components, if there were a failure in just one component, the entire system would become inoperative. Additionally, if maintenance were required, the system would likewise be inoperative while such maintenance tasks were completed. In response, clustering of computer systems was developed.

A cluster is a collection of logically grouped computers operating as a unit. One type of cluster configuration treats an entire group of computers as a single computer. This configuration is instituted for performance, where numerous low-cost consumer level computers having easily replaceable components are tied together to process tasks in parallel. Such a configuration enables high processing capabilities. Another configuration groups two or more similar computers for fault tolerance purposes. If one computer goes offline, the other takes over operations. The user sees no noticeable difference because both the data and any running applications are replicated across the two systems.

With simpler overall information systems architecture running fewer applications and data exchanges, past enterprise computing solutions segregate discrete operational units, and strictly limits data and application sharing. Separate computer systems are in place for each division of an enterprise. For example, the accounting department has a separate computer system completely isolated from the engineering department. To the extent that clustering is utilized in these enterprise computing solutions, it is merely to provide failovers within these departmental systems.

Because of cheaper network components and the need for rapidly sharing large volumes of information, it is necessary to consolidate computer systems across the enterprise. Companies often rely upon a single platform, that is, a single operating system and a single set of application and data services, for the computing needs of the entire enterprise. In order to ease administration, servers are organized according to their roles within the network. Since the roles are interdependent, however, there is also a need to manage the operation of these services from a single control point. Such a system is contemplated in U.S. Pat. No. 6,438,705 to Chao, et. al., which discloses the transfer of operations from one node to another. There remains a need for coordination of actions between clusters. Even though a node of one platform may only fail over to another node of the same platform, with mergers and growth of business organizations, such resources across diverse platforms can no longer be viewed as completely independent resources. Accordingly, failover/switchover actions must be coordinated at the enterprise level. There may be dependencies between resources, where some resources need to be available before others are initiated. In other words, an ordering of activities is required. As multiple users may be managing these large and diverse networks, a method is needed to ensure that conflicting actions are not performed.

Organizations are increasingly relying on different platforms to provide an overall enterprise computing system. A particular platform may have features required by the organization that another may not, or different platforms may have been deployed to reduce single points of failure. In single platform, there is an inherent danger that a common problem across the same operating system and applications will bring the entire computer system down. Additionally, it is desirable to provide one service on one platform, and a second service that is dependent on the first service on another platform. An example of such a configuration would be a database server operating on one platform and a web server operating on another platform, with the web server retrieving data from the database server. In this regard, the web server is dependent upon the database server. Although one server may be in a remote location with respect to another server, in some instances, the servers may be running on different partitions of a single hardware platform in a single location. For example, System i, previously known as AS/400 and developed by IBM Corporation of Armonk, N.Y., can host a partition running the AIX operating system (also developed by IBM), a partition running the Linux partition, an i5/OS partition, as well as multiple Windows (developed by Microsoft Corporation of Redmond, Wash.) partitions running on integrated xServer cards (also developed by IBM).

In each of the above-described system configuration scenarios, there are dependencies between the servers, that is, the availability of one server is predicated on the availability of another server. In certain situations, it may also be necessary to start up each such server groupings in a particular order. Continuing with the example above, the Linux partition may utilize a DB2 database (also developed by IBM) from an i5/OS partition via the Open Database Connectivity (ODBC) or Java Database Connectivity (JBDC) Application Programming Interfaces (API). This may be a local virtual connection that requires the application running on the Linux partition to be switched to a backup System i platform when the i5/OS partition is switched.

Accordingly, there is a need in the art for coordinating the failover of such diverse operating systems, with each dependency between the platforms being accounted for. More particularly, there is a need for a system capable of providing a rules structure for handling the aforementioned dependencies. A system that coordinates the activation of applications and services in the proper order is needed in the art.

BRIEF SUMMARY OF THE INVENTION

In accordance with one aspect of the present invention, a method and system for managing multiple heterogeneous clustering platforms is disclosed. This overall network is referred to as a hypercluster. In further detail, one embodiment of the present invention relates to a method for coordinating availability of data processing resources between first and second clusters of nodes. The method may include the step of receiving a disruption event associated with the first cluster. Thereafter, the method may include deriving a local action code from a hypercluster rules list. The local action code may correspond to the disruption event and contain a cluster activation sequence. Furthermore, the method may include transmitting the local action code to an active cluster manager for execution of the cluster activation sequence.

Another embodiment of the present invention relates to an apparatus for coordinating availability of data processing resources between a local node in a first cluster and a remote node. The apparatus may include a local event receiver for capturing local disruption events, as well as an event translator for translating the local disruption event to a universal event code. Furthermore, the apparatus may include a hypercluster event receiver for capturing remote disruption events from one of the nodes of the second cluster. The apparatus may further include a router for correlating the universal event code to a cluster activation sequence in accordance with a set of hypercluster rules.

The above-mentioned hypercluster rules are contemplated as being simple declarative rules, with no additional procedural programming being necessary for improving administrative ease. Where further control is necessary, the hypercluster rules may be extended to utilize external programming.

The present invention will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings.

Common reference numerals are used throughout the drawings and the detailed description to indicate the same elements.

DETAILED DESCRIPTION OF THE INVENTION

The detailed description set forth below in connection with the appended drawings is intended as a description of the presently preferred embodiment of the invention, and is not intended to represent the only form in which the present invention may be constructed or utilized. The description sets forth the functions and the sequence of steps for developing and operating the invention in connection with the illustrated embodiment. It is to be understood, however, that the same or equivalent functions and sequences may be accomplished by different embodiments that are also intended to be encompassed within the spirit and scope of the invention. It is further understood that the use of relational terms such as first and second and the like are used solely to distinguish one from another entity without necessarily requiring or implying any actual such relationship or order between such entities.

1. High Availability Computer Clusters

Figure 1:
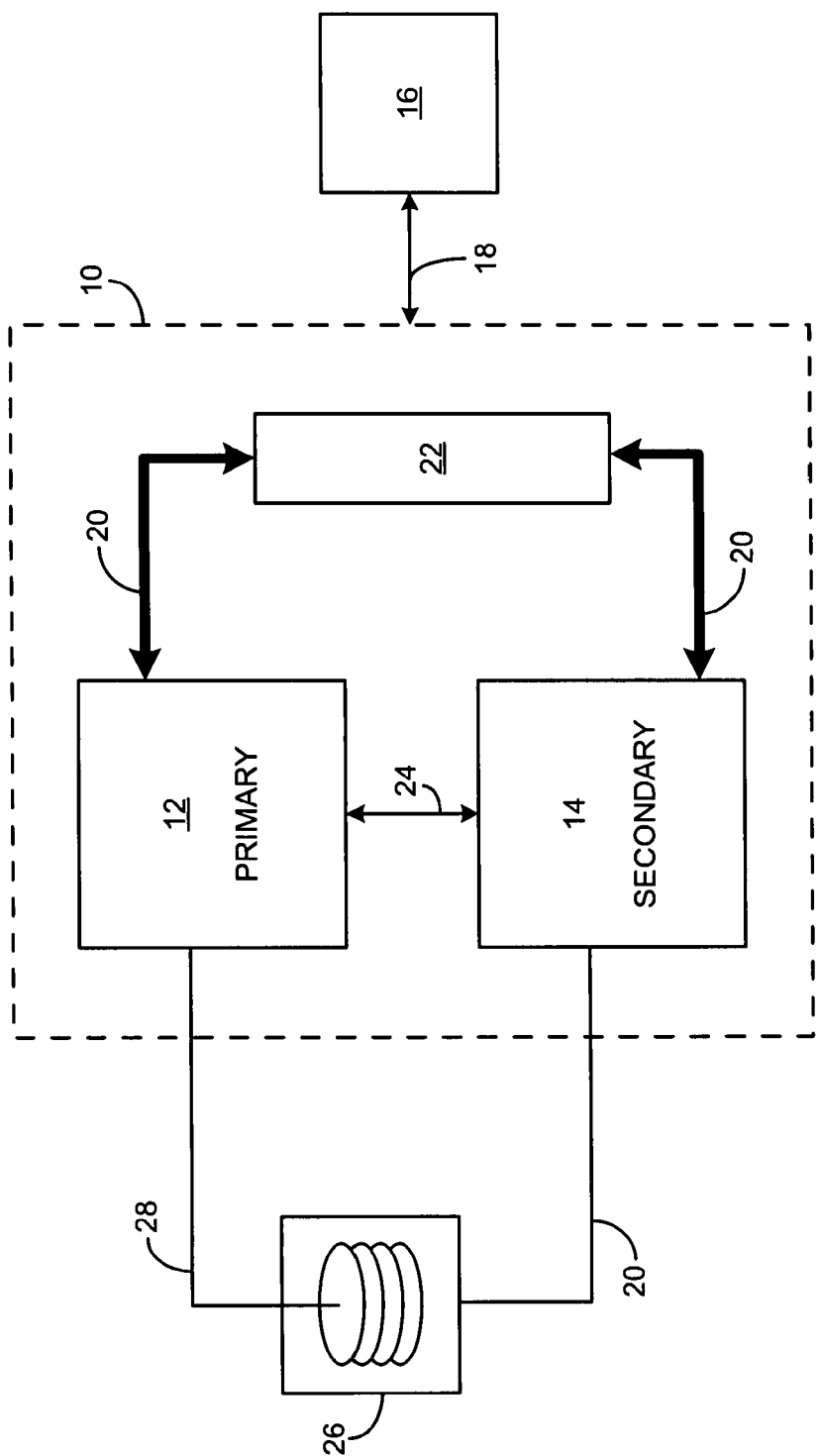
FIG. 1 is a block diagram illustrating a basic high availability computer cluster including a primary node, a secondary node, and an interconnection device linking the two.

With reference to FIG. 1, at the most basic level, a high availability computer cluster 10 includes a primary node 12 and a secondary node 14. One object of high availability clusters is to provide redundancy and eliminate single points of failure, and so when there the primary node 12 becomes unavailable for planned or unplanned reasons, the secondary node 14 is immediately able to take over operations. While both primary and secondary nodes 12 and 14 are concurrently running, absent failure or user initiated planned switchovers, only the primary node 12 provides service to a recipient 16 over an external network connection 18. As utilized herein, the term recipient may refer to a client, another server, or any other apparatus operative to receive the services provided by the primary node 12. Such configurations are referred to as an Active/Passive configuration. Alternatively, the load upon the primary node 12 may be shared with the secondary node 14 in an Active/Active configuration. While the computer cluster 10 has been described in terms of the primary node 12 and the secondary node 14, one of ordinary skill in the art will recognize that additional backup nodes may be utilized. The high availability computer cluster 10 is the building block for the network of computers upon which one embodiment of the present invention may be implemented.

In the exemplary embodiment of the computer cluster 10, the primary node 12 and the secondary node 14 are both connected to an internal network 20 over an interconnect device 22. The external network connection 18 is also tied to the interconnect device 22. As those skilled in the art will appreciate, the internal network 20 can be any suitable local area network such as Ethernet (I.E.E.E. 802.3) or Token Ring. Further, interconnect device 22 can be a hub, a router, or any suitable network interconnect device suitable for a selected local area network. In the above-described active/passive high configuration, the computer cluster 10 is assigned a single logical host address that the recipient 16 can identify.

Thus, when the recipient 16 requests a service from the computer cluster 10, it need only specify the logical host address. From the perspective of the recipient 16, the computer cluster 10 appears as a single computing resource regardless of the node providing the service. In order to coordinate the operation of the primary node 12 and the secondary node 14, a separate heartbeat network connection 24 is provided. The primary node 12 monitors the status of the secondary node 14, and the secondary node 14 monitors the status of the primary node 12 over the heartbeat network connection 24.

Data being processed by the computer cluster 10 is stored in one or more data storage devices 26 connected locally or via a storage area network (SAN) 28. Additional data storage devices 26 may be added to increase redundancy and improve availability. The data storage device 26 appears as a locally connected device to the primary node 12 and the secondary node 14, in that data is written to and read from the storage device 26 at the block level. Typically, the storage area network 28 uses the Small Computer System Interface (SCSI) protocol over at least a 1 gigabit fiber channel. Instead of a SCSI connection over a fiber transmission line, the storage area network 28 may utilize the Internet SCSI (iSCSI) protocol over a conventional LAN networking technology. The data storage device 26 is commonly a hard drive, although tape drives and other similar devices may be utilized.

Figure 2:
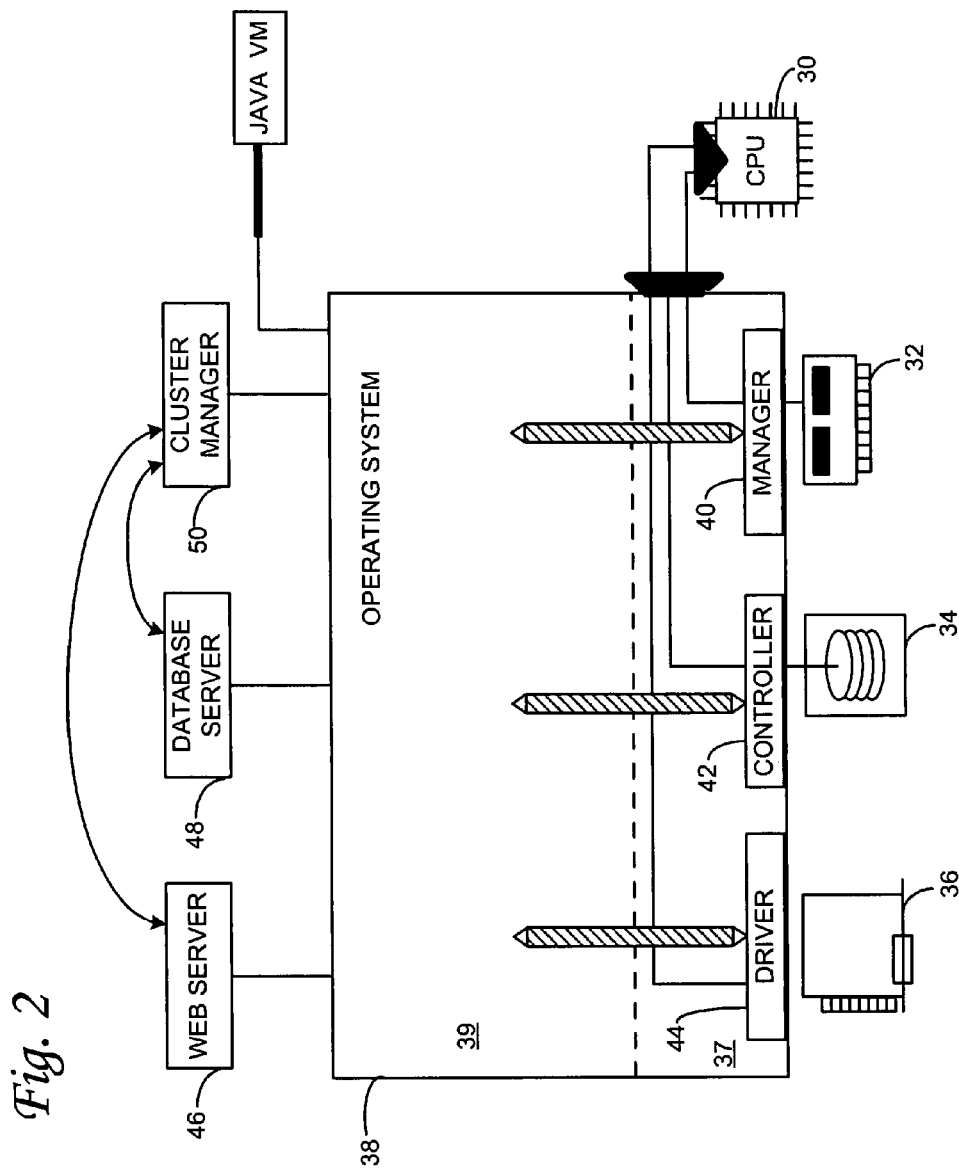
FIG. 2 is a diagram of various software and hardware components of a computer system in a high availability computer cluster.

The primary node 12 and the secondary node 14 are both data processing devices that have the general configuration including various software components and hardware devices as illustrated in FIG. 2 of a computer system 28. More particularly, there is processor 30, a random access memory 32, a storage device 34, and a network interface device 36. With respect to the processor 30, it is understood that any general purpose microprocessor may be utilized, and based on instructions being processed thereby, controls the operation of the computer system 28. In this regard, the functionality of the random access memory 32, the storage device 34, and the network interface device 36 is controlled by the processor 30. Physically, the processor 30 is connected to the respective devices via a bus or other like channel. As indicated above, the storage device 34 may be a SAN device connected over a fiber channel, and the network interface device 36 may provide Ethernet or other like networking services. The hardware devices 32, 34, and 36 may be interfaced to the processor 30 with additional controllers and other like hardware devices. The operation of the hardware devices 32, 34, and 36 are governed by an operating system 38 that may include various modules of instructions executed by the processor 30 to control the hardware devices 32, 34, and 36. In further detail, the random access memory 32 is controlled by a memory manager 40, the storage device 34 is controlled by a controller 42, and the network interface device 36 is controlled by a network driver 44. The modules provide an interface between a hardware level 37, and a software level 39. One of ordinary skill in the art will recognize that the above hardware components and organization have been presented by way of example only and not of limitation, and any other suitable components may be added as necessary.

As indicated above, the operating system 38 may be any one of the numerous computer operating systems known in the art. For example, the operating system 38 may be a UNIX variant such as AIX (previously known as Advanced IBM Unix), Linux, FreeBSD, or a Microsoft Windows, or other operating systems such as i5/OS (previously known as OS/400). Various applications interact with the operating system 38, such as a web server application 46, a database server application 48, and so forth. With respect to the database server application 48, however, it is understood that in the i5/OS operating system, it is integrated into the operating system 38.

There is also a cluster manager 50 that is in communication with the server applications 46, 48 to determine the current state of availability with respect to such applications. Cluster manager 50 is typically specific to the operating system 38. For instance, the cluster manager 50 where the operating system 38 is Windows, it may be the Microsoft Cluster Server (MSCS), where the operating system 38 is i5/OS it is the ORION product from Vision Solutions, Inc. of Irvine, Calif., or System i clustering from IBM, and where the operating system 38 is Linux, it may be the open source Linux-HA (High Availability) or a proprietary clustering software such as the Orion Java based Linux Clustering software. It is understood that any suitable cluster manager 50 may be substituted, so long as it is compatible with and capable of interfacing with certain components that are in accordance with an aspect of the present invention. Generally, the cluster manager 50 coordinates failover and switchover actions between nodes that are concurrently running the same cluster manager 50. Specifically, the cluster manager 50 monitors the status of the other node(s) with the heartbeat functionality as described above, fences off failed nodes from writing to data storage devices, and receives configuration information from an administrator, among other functions. It normally provides an exit program capability which may be utilized by users of the clustering service to provide further functionality such as managing applications. In one embodiment of the present invention, it is used to provide an interface to a Hypercluster manager from the individual platform specific clusters.

2. Hyperclusters

Figure 3:
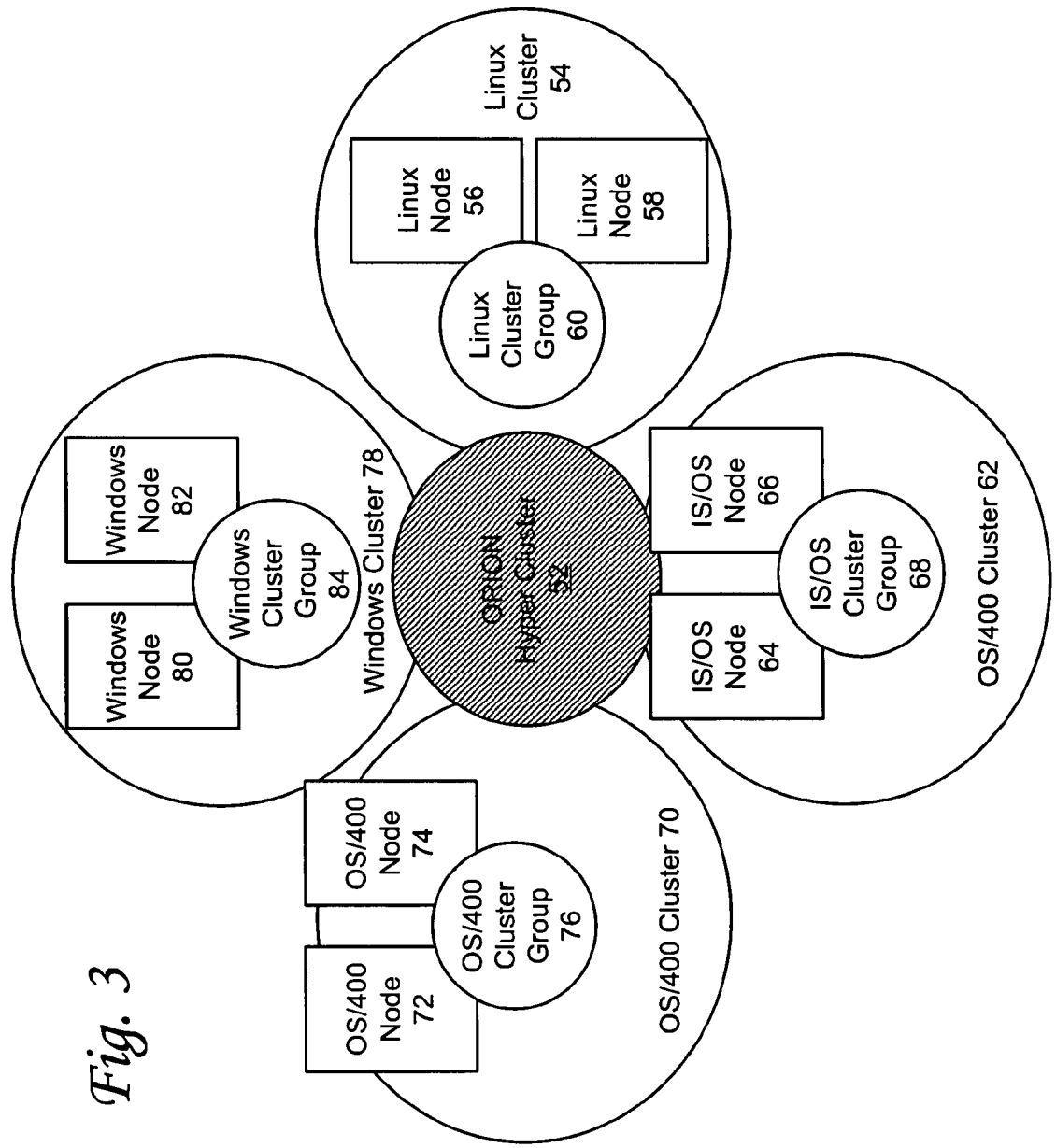
FIG. 3 is a block diagram illustrating the logical relationships in a hypercluster, including nodes, clusters, and resource groups.

With reference now to the block diagram of FIG. 3, the logical relationships of the components making up a hypercluster 52 is illustrated. As indicated above, clustering is the concept of logically grouping individual computer nodes seen as a single, unified computing resource by the clients of that resource, and coordinating the transfer of operations within the cluster in the event of a planned or unplanned termination. Nodes, or individual computer systems as described above, are logically grouped into cluster resource groups, also referred to herein as CRGs. Each cluster resource group provides some service or resource to a client as a single unit. Thus, broadly defined, the term hypercluster refers to one or more clusters. In further detail, each cluster may be made up of one or more resource groups with heterogeneous clustering and operating system architectures. In accordance with one aspect of the present invention, a Hypercluster manager handles various functions relating to the organization and management of the Hypercluster.

Generally, recovery operations in the event of a node failure are performed within the resource group, that is, when a failure occurs in one node, a second node takes over. The recovery may also be coordinated with other clusters in the hypercluster 52 when dependencies are defined in hypercluster rules. According to this aspect of the present invention, the failover/switchover within one cluster resource group can be coordinated with failover/switchover in another cluster resource group. The dependency types include location (co-locate and anti-co-locate), sequence (the order in which applications and services are activated), and dependencies on foreign resources.

In the exemplary configuration illustrated in FIG. 3, a variety of computer nodes running different operating systems are combined to form clusters of like operating systems. These clusters, in turn, are combined to form the hypercluster 52 comprising heterogeneous operating systems. A given node is identified with the operating system running on that node, and a given cluster or cluster group is likewise identified with the operating system running on the nodes of that cluster. By way of example only and not of limitation, hypercluster 52 is comprised of a Linux cluster 54, a first i5/OS cluster 62 and a second i5/OS cluster 70, and a Windows cluster 78. The Linux cluster 54 is a logical grouping of a first Linux node 56 and a second Linux node 58. The resource provided by the first and second Linux nodes 56, 58 is identified as a Linux Cluster Resource Group (CRG) 60. As utilized herein, a CRG is a group of associated resources that can be switched between various nodes in a given cluster. A single cluster may contain multiple resource groups comprising a set of services such as switched databases, switched disks, and the like.

The first i5/OS cluster 62 is a logical grouping of a first i5/OS node 64 and a second i5/OS node 66, and the services provided thereby are identified as a first i5/OS CRG 68. The second i5/OS cluster 64 is a logical grouping of a third i5/OS node 72 and a fourth i5/OS node 74, and the services provided thereby are identified as a second i5/OS CRG 76. Finally, the Windows cluster 78 is a logical grouping of a first Windows node 80 and a second Windows node 82. The services provided by the first and second Windows nodes 80, 82 are identified as a Windows CRG 84.

At the most basic level, if a single node fails in any of the clusters, the other node in the cluster will take over its operations. For example, if the first Windows node 80 fails then the second Windows node 82 assumes the role previously held by the first Windows node 80. It is to be understood that the specified arrangement is by example only and not of limitation, as the two nodes can be members of multiple resource groups, which are representative of different services running concurrently on the same nodes.

In accordance with another aspect of the present invention, a method of coordinating failovers across multiple clusters is provided. Referring back to FIG. 2, a hypercluster manager 86 is in communication with the cluster manager 50 and receives node status information therefrom, as well as from other instances of hypercluster managers on other computer nodes. The hypercluster manager 86 stores information relating to the dependencies amongst the resource groups in the hypercluster 52. In order to ensure portability of the hypercluster manager code, it is preferably written in Java and runs on a Java Virtual Machine (JVM) 88. However, it is to be understood that any programming environment that abstract the details of the specific platform on which it runs may be substituted, for example, by way of a virtual machine. Further details relating to the structure and modalities required for coordinating actions between clusters across diverse clustering architectures and operating systems will be described below.

a. The Extended Finite State Machine

In accordance with one aspect of the present invention, a tokenized three-phase commit is utilized at the cluster level for Linux, AIX, and UNIX. As understood, other cluster protocols such as Windows Cluster Manager, i5/OS cluster manager and others do not use a tokenized three-phase commit. The foregoing protocols all provide the modality to trigger an exit program when an event occurs, however. It is understood that the term event refers to an activity that can change or be part of a set of actions that change the state and/or membership of a cluster and its associated resource groups. Events may include activities requested by a user, or events such as power failures. Generally, events affect the availability of various resources. The aforementioned exit programs may be leveraged as an exit "plug in" for various cluster managers so that the exit can be made to send an event to the Hypercluster manager. The Hypercluster manager may thus wait for the Hypercluster-level tokenized three phase commit. Alternatively, cluster rules can specify that the sending program need not be forced to wait, and an immediate continue response is given to the exit program. The individual cluster can continue as predefined for the event, while the Hypercluster events run asynchronously. It will be recognized by those having ordinary skill in the art that either of the foregoing may be implemented, but depending on the types of relationships and the existence of timing or other restrictions in which view synchrony must be maintained at all times, one may be preferred over the other. As utilized herein, the term "view" refers to a perspective of all nodes in a cluster and their states, including whether they are up (operational) or down (inoperative), and whether they are designated primary, secondary, etc. Since a Hypercluster contains a list of views of disjoint clusters, the Hypercluster view is a view of all nodes in all clusters comprising the Hypercluster.

The finite state machine in accordance with one aspect of the present invention includes the ability for each State and Event Combination to perform three actions: a rule search, transmission of a response message, and the performance of actions typically defined as exit programs or spawned procedures based on a match of the rules before performing a transition to the subsequent state. This state machine is used in designating the states of the various nodes in a cluster and/or hypercluster under various conditions.

Formally the state machine is defined thus:

$$FSM \equiv \text{quintuple}(\Sigma, S, s_0, \delta, F)$$

where Sigma≡input alphabet of symbols(conditions), S=The set of states in the state machine and where S is not Empty, $s_0$ is the initial start state where $s_0 \in S$, $\delta \equiv$ to the state transition (s∈S), (cond∈Σ)⇒$s^{new} \in S$, and F≡Set of Final or accepting states where F∈S.

Formally, the Orion Extended Finite State Machine extends the above definition to:

$$OEFSM \equiv \text{octtuple}(\Sigma, S, s_0, R, M, A, \delta, F)$$

where R≡a set of rules to be checked at State s, A≡a set of actions to be performed and where $\delta \equiv sx(\text{cond} \in \Sigma)x(r \in R)) \Rightarrow (a \in A)$, (m∈M), ($s^{new} \in S$), and M≡Resulting message on Rule Match as in A (action above). This extended definition maintains the rules for finite state automata, but permits the association of rule-based actions to each transition δ in the state diagram.

b. Consistent Views and Consistent Membership History

The Orion Extended state machine manages the conditions and associated actions for these events. The Orion Extended Finite State Machine (OEFSM) looks at the events from the perspective of a cluster resource group but with an open interface to other resources groups. Therefore, in order to consistently manage the hypercluster the protocol must achieve consistent views and consistent membership history. That is, all of the components of the hypercluster must agree on the view in each Cluster Resource Group, and on the sequence of changes to the state. If a node is removed from a particular cluster and associated Cluster Resource Groups, all participants in the hypercluster must understand and share the changes to the view that this causes. This is due to the dependencies between operating systems.

The following is the definition used in consistent history view synchronicity protocols:

$$\text{ConsistentHistory} \equiv \forall p, q, j (V_p j = V_q j) \lor (V_p j \cap V_q j = 0)$$

Where ∀ means "for all", ∩ refers to a union of two sets, ≡ means "equivalent to", and ∨ refers to a Boolean "OR". Additionally, as utilized herein, Σ or sigma refers to the alphabet of conditions, and ∈ means "contained in", and ∧ refers to a Boolean "AND".

View History Consistency is a means of solving the case where a partitioned cluster allows some events to continue occurring asynchronously and where these events are then placed in a view, so that all partitions in the cluster agree on the series of views in which events occur. According to another embodiment, this restriction may be relaxed where the hypercluster 52 can delay cluster events or the execution of generated events, resulting in event serialization.

The following is the definition used in consistent current view:

$$ConsistentClusterMembership \equiv \forall n, m \in NV_n = V_m)$$

A View is an array V where $$\forall n \in MV_v, n = \text{viewof}(n) \text{byviewingNode}(v)$$

The following is the definition used in Hypercluster View consistency:

$$ViewConsistency \equiv \forall n, m, n \in N, m \in M(V_n = V_m)$$

c. View Definitions

A view definition includes the members of a cluster and/or hyperclusters and their roles. This relates to the need for consistent views and consistent membership. A view definition must be shared between members in the cluster even though the events are asynchronous. That is, the messages must be passed between the clusters so that a new shared consistent view of the cluster and its resource groups is achieved. The token control ensures that conflicting actions are not taken by distinct users or external events so that consistent views can be achieved once all messages are processed in all clusters. The dependencies defined in the hypercluster rules ensure that the messages and state changes are processed in the proper order.

Generally, node membership in a cluster is defined as ∀Nodes∈Cluster if N∈C1, M∈C2, and If λ≡EmptySet. To prevent conflicting activities from occurring in disjoint clusters, that is, Cluster C1 contains node set and Cluster C2 contains node set M, and where $$Disjoint \equiv (N \in C1) \wedge (M \in C2))N \cap M = \lambda$$

the coordination must not be by states but rather by message passing as in a partitioned cluster. Token control must exist between the clusters of the hypercluster 52 in order to properly serialize activities over all clusters.

d. Three Phase Commit

Three phase commit refers to an algorithm with three steps to ensure that a process does not make a decision unless every process that has not yet failed is "ready" to make such decision. That is, every non-failed process must be guaranteed to achieve a "Consistent View". As utilized herein, the term process refers to a dynamic resource with a state. For example, a process may be a database application such as a DB2 Database Management System running on a node with an active or an inactive state. It is understood that multiple processes can be hosted on a node in a cluster, such as web servers, communications processors, and the like.

Figure 6:
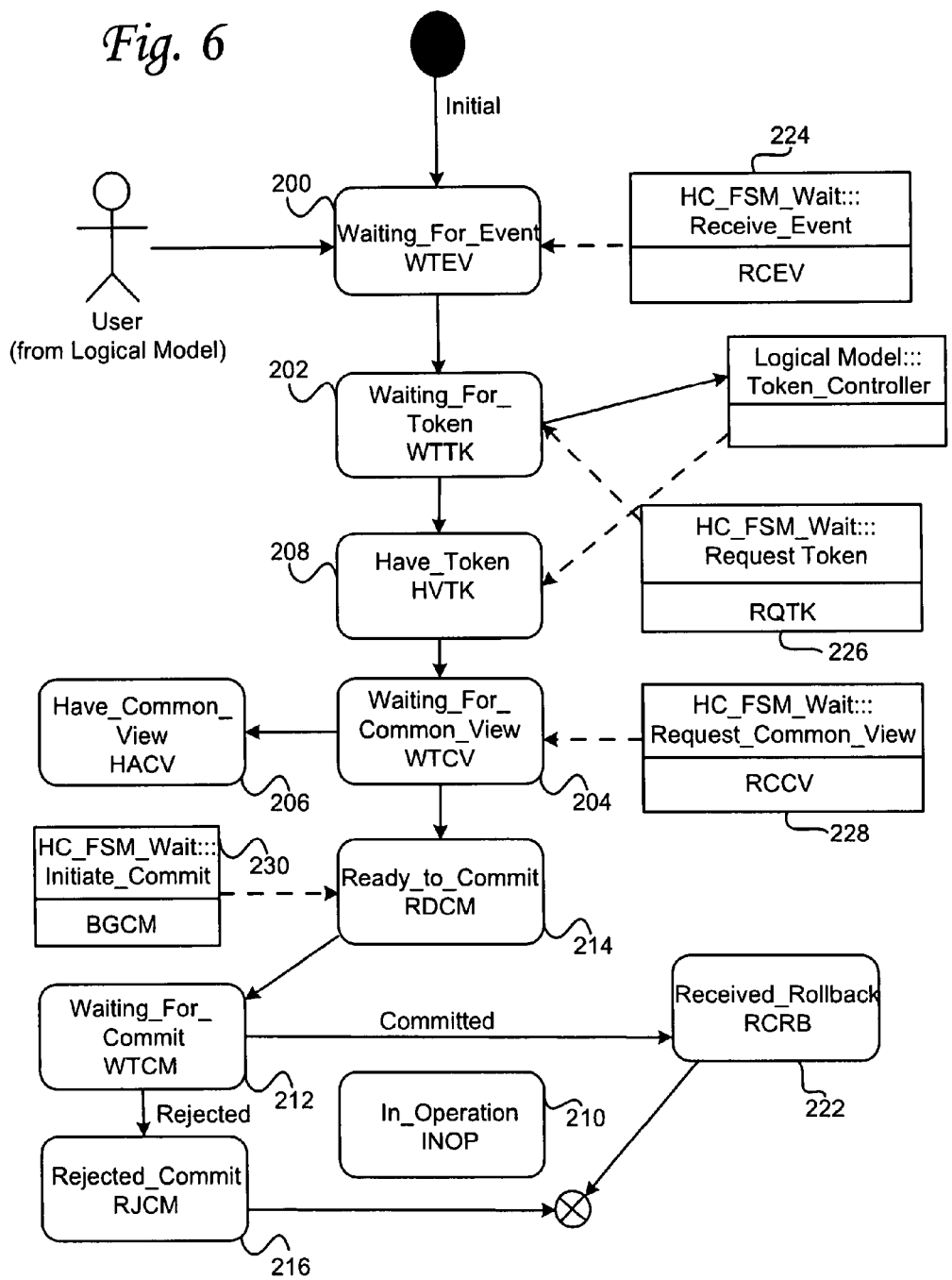
FIG. 6 is a state machine describing the Hypercluster states and transitions in accordance with an aspect of the present invention.

With reference to FIG. 6, the states of the three phase commit include Waiting for Event (WTEV) 200, Working for Token (WTTK) 202, Waiting for Common View (WTCV) 204, Have Common View (HACV) 206, Have Token (HVTK) 208, In Operation (INOP) 210, Waiting for Commit (WTCM) 212, Ready to Commit (RDCM) 214, and Reject Commit (RJCM) 216. The events of the three phase commit include Received Token (RCTK), Received View (RCCV), and Received RollBack (RCRB) 222. The three phase commit actions include Receive Event (RCEV) 224, Receive Token (RQTK) 226, Receive Common View (RCCV) 228, and Initiate Commit (BGCM).

The three phase commit FSA transitions are as follows:
(s=WTEV,Σ=RCEV,A=RQTK,s"=RQTK)
(s=RQTK,Σ=RCTK,A=null,s"=HVTK)
(s=RQTQ,Σ=RCTK,A=null,s"=HVTK)

The three phase commit algorithm in accordance with one aspect of the present invention gets n processes to agree on a result which is either 1 or 0 for a commit decision. It requires 3n rounds as each process communicates with all other processes. The algorithm does not provide a solution to the view agreement problem or to the actions to be performed on the Orion Extended Finite State Machine, and does not consider some economies that can be achieved by utilizing the Tokenized cluster approach. Thus, there can only be one token owner and one token controller at any one point, and so a single node proposes an action. As such, it is possible to reduce the lower bound on the number of rounds, as the cluster manager has incurred the overhead of performing heartbeat and token allocation. Therefore, such tasks need not be repeated as part of the three phase commit. The following is a more formal description of this issue:
Standard3PC(numberofrounds=3n)
Standard3PC(roundswithter min ation=3n)
Orion3PC(numberofrounds=3)
standard3PC(numberofmessages=x)
Orion3PC(numberofmessages=3(n−1)*2)
ViewAgreement≡SingleCommitCase Token allocation, View Agreement, and Cluster state change transactions are each three phase commit cycles. A conventional termination protocol is utilized to detect cases where the requesting node fails at a point where the other processes are left in an undecided state. The tokenized three phase commit termination protocol is as follows: if the token owner is not the token controller and the token is returned to the token controller after the commit phase, the originating process did not fail so the termination protocol is not required. This is understood to be the vast majority of cases. Thus, the number of rounds required in the normal case is shortened. After performing a commit action, affected nodes other than initiator sends messages to the token controller to determine whether the token has been returned. If the token controller responds that it has possession of the token and that it is available, no further termination required. If the token is lost after a commit action, then all processes must assume zero. If the token owner is the token could token controller, and if the token allocated state is set to not allocated, then the requesting process is completed as long as the token controller has not changed. The view includes the token owner and the token controller, and so this is available to all nodes.

The CRG is defined by a group of associated resources which can be switched between nodes in a cluster. A single cluster may contain multiple cluster resource groups comprising a set of switched databases, switched disks, etc. The CRG states include Waiting for Event (State 0 or Start State) (WTEV), Starting (STRT), AmPrimary (ISPR), Pending Bringing Applications UP (PNPR), and Bringing Application Down (PNDN). The CRG events include Fail Over (RCFO), Switch Over (RCSW), App is Down (RCDN), and App is Up (RCUP). CRG actions include Initiate Switch Over (STSW), and Initiate Fail Over (SFTO).

According to another aspect of the present invention, the world heartbeats required to monitor a large number of nodes in multiple clusters is reduced. As understood, the number of heartbeats in an n to n cluster is Hearbeats=n*(n−1). For example, a cluster would require six heartbeats. Further, if there are two three-node clusters performing the n-to-n heartbeating, then the total number of heartbeats is 14. Specifically, the first three node cluster requires six heartbeats, the second three node cluster requires another six heartbeats, and the hypercluster including two individual clusters requires another two heartbeats. If heartbeats are to be performed on each of the nodes in the above example, there would be n*(n−1) or 6*5 or 30 heartbeats.

As indicated above, the hypercluster 52 is defined as a disjoint cluster where the hypercluster relationship is used to control autonomous events that happen outside the control of human actors, conscious events that happened under the control or at the initiative of human actors, and generated events that are generated based on input from an autonomous or a conscious event. Communications in the hypercluster include view changes from autonomous event request for view changes from initiated or generated events. More specifically, autonomous$\Rightarrow_{rules}$ViewChange$\Rightarrow_{rules}$ generated
HumanActor$\Rightarrow_{rules}$ conscious
Conscious$\Rightarrow_{rules}$ViewChange$\Rightarrow_{rules}$ generated
conscious$\Rightarrow_{rules}$ Rejection
generated$\Rightarrow_{rules}$ generated
generated$\Rightarrow_{rules}$ New View
ViewChange$\Rightarrow_{rules}$ generated
ViewChange$\Rightarrow_{rules}$ New View
ViewChange$\Rightarrow_{rules}$ Rejection It is understood that while a single cluster and a cluster resource group each have tokens, a hypercluster may not. If serialized events are required, a single HyperCluster token may be implemented although this may impact the speed with which actions are carried out in the individual clusters.

Cluster resource group relationships are within a cluster and between clusters in a hypercluster, specifically, between specific cluster resource groups in clusters. All cluster events, including heartbeats, are sent to all nodes in the cluster. With respect to the hypercluster 52, the individual clusters do not share all the events with nodes in other clusters. Thus, the hypercluster 52 is responsible for informing other clusters of events having relevance thereto. All cluster resource group events where a hypercluster relationship exists are sent to the associated clusters along with the associated view of the cluster in which it occurred. It is understood that this maintains view consistency. Coordinated Failover defines dependencies during switchovers between multiple cluster resource groups in the hypercluster 52.

e. Token Definitions

Generally, the token use and allocation rules specify that there is one Cluster Token ("CT") per cluster and/or Hypercluster, one Resource Token ("RT") per cluster Resource Group, one Token Controller ("TC") per cluster and/or HyperCluster, and one Token Controller per Cluster Resource Group. If a Cluster Resource Group is partitioned, it functions similarly to two cluster resource groups, that is, a one token exists for two partitions for a total of two. Accordingly, there is provided state steps or phases at which the three phase commit will stop. The token use and allocation rules can be changed dynamically as the extended state machine can check state and sub-state status and determine when the operation is complete. Sub-states can define if the token is to be returned or not. The purpose of the FSA is to provide deterministic behavior for the state transitions, by the Extended FSA allows behavior to be attached to the defined states. It is assumed that all view changes are sent to all related Cluster Resource Groups and that a state change is a view change.

f. Declarations

For the following declarations, the Backus-Naur Form (BNF) is used, where the syntax is:

Definition≡Element→Element(Default,optional-values)$^{repeatcount}$)

A Hypercluster managed cluster is thus defined as:
Protocol(Orion,Windows,OS400,AIX$_H$,ACMO, . . . )
and so:
CstId→Protocol(ORION,OS400,MSCS, etc)
→NodeCnt→Nodes$^{NodeCnt}$ A Cluster Resource Group is thus defined as:
CRG≡CSTId(*Same,CSTID)$^{0,1}$→CRG→ResourceType (SWDEV,MIRRDEV,REPDATA,SERVICE)

In turn, a Cluster Resource Group Relationship is thus defined as:
CRG≡FrmCSTId(*Same,CSTID)$^{0,1}$→
FromCRG→ToCSTId(*Same,CSTID)$^{0,1}$→
ToCRG→RulesBase(File→Path)$^{1}$→
RelProtocol(*ORION,Other . . . )$^{0,1}$TakeoverIP A Cluster Resource Group Events Rule Base is defined as:
Rule≡NodeRole(P,B1,Bn,RP,Sn,*ALL)→
EventId(*ALL,EventId)$^{0,1}$→
ExitPgmId)$^{0,1}$→
Synchronicity(*WAIT,Notify,*none)

In a preferred embodiment of the present invention, there is provided meta rules, or rules relating to the use of rules. Some sample meta rules include:
CT∈ClusterSet
CT.CRG∈Cluster
Node∈CRG
Event∈EventsList
Role∈RolesList
ExitPgm∈ExitPgmList Resources are defined as:
ResourcePacket≡Parent→(Child)$^{+}$→
Sequence→
Resource→ResourceType→(ExitPgm)$^{0,1}$ Specific definitions of meta-definitions of exit program names and protocols are illustrated in the VISION_CP-ML.DTD file of Appendix B. As will be appreciated by those of ordinary skill in the art, such meta-definitions are particular to the clustering application being managed in an installation.

Exit programs are defined as:
ExitProgram≡PgmId→Name→
Path→Type(EXE,PERL,BlackBox)→
ParmCnt→(Parm→Type→
DefaultValue)$^{ParmCnt}$ A CRG Message protocol, for both the Hypercluster to CRG, and CRG to CRG are defined as:
CRGMsg≡MsgId(XMLNo)→FromCst(*SAME, FrmCstId)→
FromOS(*SAME,FromOS)→→View A view is further defined as:
View≡OrigNode→OrigViewNo(0,n)$^{1}$→
CstId→NodeIndex→NodeCnt→
(ViewofNoden)$^{NodeCnt}$ 3. Exemplary Configuration In the exemplary illustration of FIG. 4, the hypercluster 52 is configured for redundancy in running a web application, where the first i5/OS CRG 68 provides a database service, the Linux CRG 60 provides web services. A web server may retrieve information from a database to generate web pages transmitted to remote user, and so the availability of the web server on the Linux resource group 60 depends on the availability of the database service on the first i5/OS CRG 68.

Figure 4:
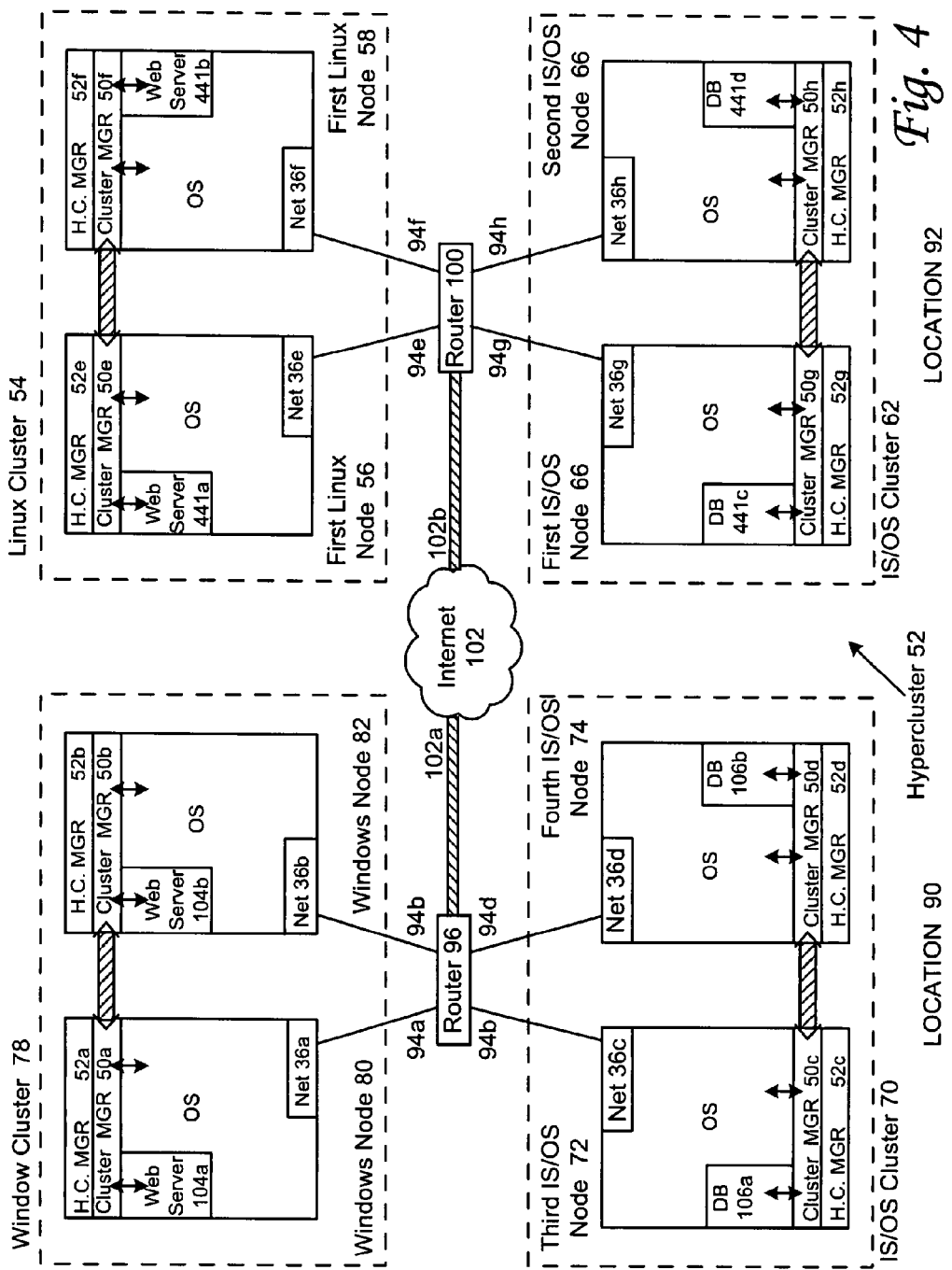
FIG. 4 is a block diagram showing the functional relationships between nodes, clusters, and a hypercluster.

In an exemplary configuration as illustrated in FIG. 4, suppose the first i5/OS CRG 68 and the second i5/OS CRG 76 provide database resources, while the Windows CRG 84 and the Linux CRG 60 provide web server resources. A web server typically retrieves information from a database to generate web pages to transmit to a remote user, and so the availability of the web service resource is said to be dependent on the availability of the database resources. In this exemplary configuration, the (web server) Windows CRG 84 dependent on the (database) second i5/OS CRG 76, and the (web server) Linux CRG 60 is dependent on the (database) first i5/OS CRG 68. Additionally as shown in FIG. 4, the third and fourth i5/OS nodes 72, 74, and the first and second Windows nodes 80 and 82 are in a first location 90, while the first and second i5/OS nodes 64, 66 and the first and second Linux nodes 56, 58 are in a second location 92. As indicated above, the Windows cluster 78, the first and second i5/OS clusters 62, 70 and the Linux cluster combine to form the hypercluster 52. In this configuration, the resources are said to be co-located, and is a way to ensure availability in case all of the computers in one location go offline due to a catastrophe such as complete destruction, power outage, or other failure. Depending on the system administrator's configuration, if either the database resource on the second i5/OS CRG 76 or the web server resource on the Windows CRG 84 fails, the hypercluster 52 transfers the databases resources to the first i5/OS CRG 68 and the web server resources to the Linux CRG 60. Because one resource is dependent on the other, the order of activating the resources may be crucial. In one instance, the database resource on the first i5/OS CRG 68 is brought online, and then the web server resource on Linux CRG 60 follows. This type of grouping is referred to as a regular dependency. On the other hand, there may be situations where the order of activating the resources may be inconsequential. Such a configuration is referred to as a regular relationship.

Referring now to FIG. 4, an example of the steps taking place after a resource group failure occurs will be explained from the perspective of the hypercluster 52. The first and second Windows nodes 80 and 82 form the Windows cluster 78, the third and fourth i5/OS nodes 72, 74 defines the second i5/OS cluster 70, the first and second Linux nodes 56, 58 forms the Linux cluster 54, and the first and second i5/OS nodes 64, 66 form the first i5/OS cluster 62. As understood, the groupings are discussed in terms of clusters, and not CRGs.

The roles of the cluster managers and hypercluster managers on each of the nodes are substantially the same. Instances of cluster managers 50a and 50b coordinate failovers within the Windows cluster 78, and cluster managers 50c and 50d coordinate failovers within the second i5/OS cluster 70. Further, cluster managers 50e and 50f coordinate failovers within the Linux cluster 54, and cluster managers 50g and 50h manage failovers within the first i5/OS cluster 62. Hypercluster managers 52a, 52b, 52c, 52d, 52e, 52f, 52g, and 52h collectively manage failovers across clusters and reside on the first Windows node 80, the second Windows node 82, the third i5/OS node 72, the fourth i5/OS node 74, the first Linux node 56, the second Linux node 58, the first i5/OS node 64 and the second i5/OS node 66, respectively.

The nodes in the Windows cluster 78 and the second i5/OS cluster 70 are connected to each other via local area network connections 94a-d and a first router 96, and data originating from these nodes is transmitted from network interface devices 36a-d. As indicated above, these clusters are in the first location 90. The nodes in the Linux cluster 54 and the first i5/OS cluster 62 are connected to each other via local area network connections 94e-h and a second router 100, and data originating from these nodes is transmitted from network interfaces 36e-h. These two clusters are in the second location 92, and are physically separated from the first location 90. Both the first and second routers 96, 100 are connected to the Internet 102 via Internet connections 102a and 102b.

As can be seen, each node in the Hypercluster 52 is capable of communications with every other node in the same. The illustration of the Internet 102 here is by way of example only and not of limitation, and any suitable wide area network may be used. Further, it should be understood that the organization of the particular hypercluster 52 shown in FIG. 4 is also by way of example only, and that there are numerous configurations in which aspects of the present invention may be implemented.

4. Use Cases

Based on the foregoing, a number of node termination events may occur:

a. A single node in any of the clusters fails, but the system is operational and there are no dependencies defined between the application on the failed node and other applications in other clusters. For example, a web server 104a on the first Windows node 80 crashes. The remaining nodes in the hypercluster 52 is still operational and able to communicate with the other nodes, and so the cluster manager 50a is able to transmit a message to the cluster manager 50b, and the second Windows node 82, in particular a web server 104b takes over the web server functions. The cluster manager 50a will transmit a message to hypercluster manager 52a that this has occurred, and takes action accordingly. Once the cluster manager 50b receives notice of the failure in the first Windows node 80, it also transmits a message to the hypercluster manager 52b that a failure has occurred. In this arrangement, failure of the first Windows node 80 does not create availability problems because it is handled intra-cluster. When the aforementioned notice is sent to the hypercluster manager 52b, there are no relationships found so there is no need for operations to be transferred to a separate cluster. No further action is required of either the hypercluster manager 52a or 52b, and each issues a "continue" response to the cluster manager 50a, 50b, respectively. This decision is based on specified dependency rules.

b. A single node fails, with dependencies to another node, but that single node is completely offline and unable to communicate with any other node. For example, a power outage forces Windows node 50 offline. Further, dependency rules dictate that the web server 104a runs off of a database application 106a, and that the web server 104b runs off of a database application 106b. After the first Windows node 80 is interrupted, the cluster manager 50b detects the event, and accordingly transfers web serving functionality to the second windows node 82. A cluster exit program associated with the second windows node 82, which was just been transferred operations, calls the Hypercluster manager 52b. Based upon the aforementioned dependency rules, the Hypercluster manager 52b determines that the database functionality must be transferred over to a database application 106b, from the database application 106a, and must be active before the web server 104b on the second windows node 82 is activated. The cluster manager 50c transmits a message to the hypercluster manager 52c, where control is transferred from the database application 106a to the database application 106b. When this is available, the exit program on the second Windows node 82 is instructed to continue. As understood, this decision making process is based on a specified rule.

c. A resource provided by a cluster is manually ended for maintenance, with dependencies defined between the resource and the nodes in the cluster. For example, the third and fourth i5/OS nodes 72, 74 may include a switched disk 108, with the web servers 104a,b dependent thereupon. Furthermore, data for the database applications 106a,b on the third and fourth i5/OS nodes 72, 74 may be hosted or stored on the switched disk 108. Upon manual termination of the third i5/OS node 72, the exit programs associated with the cluster manager 50c sends a message that a switchover has been requested. The exit program from the cluster manager 50c (of the third i5/OS node 72) sends a message to the local Hypercluster manager 52c that the third i5/OS node 72 is being deactivated. The message is translated, and the rules are checked for dependencies. In the present example, a dependency may state that the first Windows node 80 must be linked to the third i5/OS node 72, and the second Windows node 82 must be linked to the fourth i5/OS node 74. In this configuration, the rule will direct that when the database applications 106a,b on the second i5/OS cluster 70 performs a switchover, the web servers 104a,b in the Windows cluster 78 also performs a switchover. Because the web services are dependent on the database service, it is necessary to start the switchover process on the second i5/OS cluster 70 before starting the switchover process on the Windows cluster 78.

d. An entire cluster fails, resulting in a separate cluster assuming responsibility. For example, both the third and fourth i5/OS nodes 72, 74 fail, resulting in the first and second i5/OS nodes 64, 66 taking over. More particularly, all of the nodes in a cluster fail and is unable to communicate with any other nodes in the Hypercluster 52. Unlike the previous three scenarios, there is no heartbeat failure, and the failing node does not report an event to the local Hypercluster manager 52. According to one embodiment, Hypercluster-wide heartbeating is not performed. Still, if any resources exist that are dependent on the resource, the other cluster managers recognize this event as a failure of a needed resource. If rules are defined such that a switchover to the first i5/OS cluster 62 (or others) is to be made, then the event will be sent thereto via the Hypercluster manager 52. An example of the syntax and required fields in the Hypercluster rules is illustrated in the HC_RULES.DTD XML data type definition file of Appendix A. By way of example, if the Hypercluster rules Site List is Windows CRG 84 and the event list is "COMM", to represent that it cannot communicate with a cluster, a message is sent to ATTLIST_ID and Site ID, the second i5/OS CRG 76 with the same group ID and Event Name (START) to start that cluster.

It is understood that the platform-specific plugin for the Windows cluster 78 defines a message to the exit program to modify the floating or takeover IP address, to ensure that any connections are made to the first i5/OS cluster group 68 instead of the first i5/OS cluster group 76. The local takeover IP address associated with the second i5/OS cluster group 76 is insufficient to cause clients to move to the first i5/OS cluster group 68. If the first i5/OS cluster 68 is defined as the backup cluster, the third and fourth i5/OS nodes 72, 74 immediately transfer operations to itself.

Again, it is at the option of the system administrator to transfer the operations of the web server, and such a decision is determined by a rule. By way of example only and not of limitation, this will typically occur as multiple nodes under the same operating system and within the same cluster. As will be appreciated by one of ordinary skill in the art, the foregoing example will most likely not be encountered in actual configurations. One possible scenario is where a web server is generating local data and/or using static data that can be used from a backup. Any replicated databases or switched disks would typically be in the same cluster, so any data completely outside a cluster would most likely not have a current database. Nevertheless, the foregoing example illustrates one aspect of the present invention in which automated switchover actions, including any dependencies attendant therewith, can be performed between independent clusters despite the fact that there is no hypercluster-wide heartbeating amongst the constituent clusters.

e. Manual switchover initiated on one node, where the node has a dependency with another cluster. By way of example, a manual switchover may be initiated between the first Linux node 56 and the second Linux node 58, where both have dependencies to the i5/OS cluster 62. Thereafter, the i5/OS cluster 62 may make a switch from the first i5/OS node 64 to the second i5/OS node. In this instance, the cluster manager 50e is instructed by a user action to switch over operations to the second Linux node 58, possibly due to planned maintenance on the first Linux node 56.

Further details relating to the functionality of the Hypercluster managers 52a-h in relation to the above contingencies will be considered more fully below.

In the foregoing examples, references were made to rules. These rules are typically set by the system administrator, but need not be human generated. In an exemplary configuration, the rules can be generated by autonomic agents capable of adjusting the parameters of the hypercluster for optimal efficiency based on historical data and other criteria.

5. The Hypercluster Manager

Figure 5:
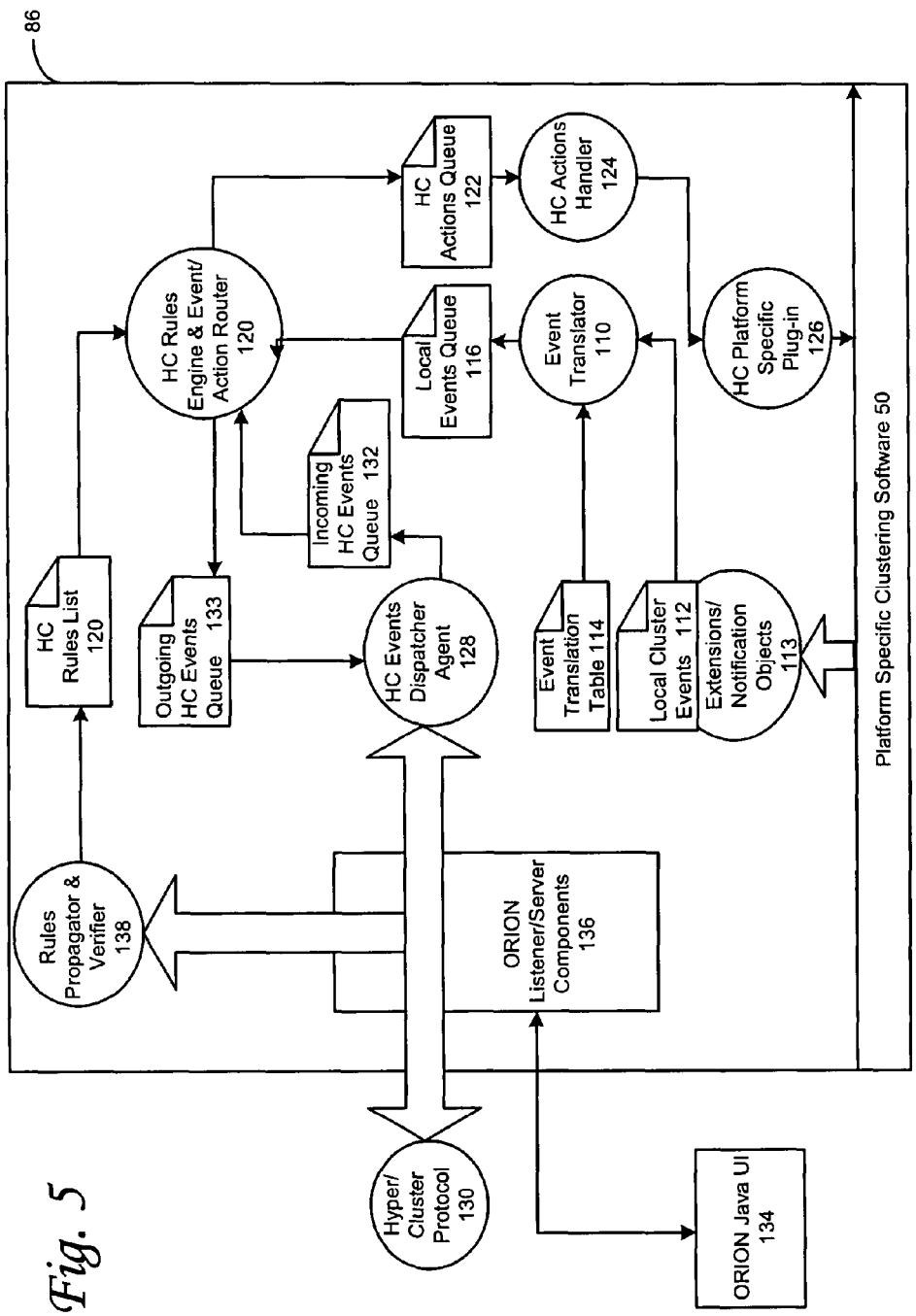
FIG. 5 is a block diagram showing the various components of a hypercluster manager.

With reference now to FIG. 5, the detailed operation of the hypercluster manager 86 will be provided. In its most basic and generic form, the hypercluster manager 86 receives an input, processes that input, and generates a response. More specifically, the hypercluster manager 86 receives event notifications from the node on which it resides ("local node") and other nodes in the hypercluster 52. Additionally, it receives input from either a local node user or another node in the hypercluster, in the form of updates to the rules utilized to make decisions on how to control the hypercluster. Based on these inputs, hypercluster manager 86 generates as outputs instructions for actions to be taken on the local node, or dispatches events notifications to the other nodes. An event translator 110 translates all platform-specific cluster events to a global hypercluster event identifier.

The first type of input is an event notification from the local node. The cluster manager 50 detects an event on the local node, and the hypercluster manager 86 receives notice of this event by capturing it from the cluster manager 50. The format and meaning of the local event code 112 is only understood by the local cluster manager, and is generally not recognized by the cluster managers 50 on other platforms. The local event code 112 may further include extensions 113 to existing events and notification objects. The event translator 110 receives the local event code 112, and using an event translation table 114, converts same to a format understood by a hypercluster rule engine and event/action router 118 (referred to as the hypercluster router). The Event translation table 114 is preferably an Extensible Markup Language (XML) file that maps the local event code 112 to a corresponding hypercluster event code, but can also be any object that describes the relationship between a local event code 112 and hypercluster event code. An example data type definition of the event translation table 114 is shown in the TRANSLATOR_RULES.DTD file in Appendix C. Following its translation, local event code 112 is placed in a local event queue 116.

The hypercluster router 118 retrieves the hypercluster event code as well as a hypercluster rules list 120. In an exemplary configuration, hypercluster rules list 120 is an XML file structured to include the following elements representative of: 1. The hypercluster event code, 2. The node and resource group from which it was received, and 3. The hypercluster action code (the action to take in response to the event code). Appendices A, B, and C contain examples of XML that provides the Hypercluster and event translation rules. The hypercluster event code can be representative of a node that has already started or stopped, or that has begun starting or stopping.

Additionally, the hypercluster router 118 searches for a rule where the first and second elements of the XML file matches the retrieved hypercluster event code and node/resource group. After finding such a rule, hypercluster router 118 extracts the third element (hypercluster action code), and places that information in a hypercluster actions queue 122. A hypercluster actions handler 124 subsequently retrieves the hypercluster action code from the queue, and converts it to a local action code, which is an action code in a format understood by local cluster manager 50. The local action code is captured by local cluster manager 50, and implements that action. This action can either be starting the node or stopping the node.

Simultaneously, the hypercluster event code is sent to all of the hypercluster managers in the other nodes that hypercluster rules list 120 requires. The hypercluster router 118 and the Hypercluster Actions handler 124 determine if the event impacts the receiving cluster. The hypercluster event code is first placed in an outgoing events queue 133, and retrieved therefrom by a hypercluster events dispatcher agent 128. The hypercluster events dispatcher agent 128 then creates a packet of information conforming to a hypercluster protocol 130 containing the destination node, the origin node, and the retrieved hypercluster event code. The packet is then sent to the destination node.

A second type of input is an event notification from a remote node. A remote hypercluster manager transmits a message to the local node in the same fashion as described above. The remote hypercluster manager places an event code into a hypercluster protocol packet, and transmits it to specified destination nodes. When the local hypercluster manager 86 receives such a packet, the hypercluster events dispatcher agent 128 extracts the hypercluster event code and determines whether its destination is the local node. Because the destination information is encapsulated into the packet, the extracted destination information is compared with the local node identification. If the two values match, that is, the local node and the extracted destination node are equivalent, the hypercluster event code is placed into an incoming events queue 132. Otherwise, the event is discarded as having no impact on the node.

Hypercluster router 118 then retrieves the event code from the incoming events queue 132, and initiates a processing procedure similar to that described above for local event codes. The hypercluster router 118 retrieves the hypercluster rules list 120 and searches for a rule where the event and source node/resource group elements of the XML file matches the retrieved hypercluster event code and node/resource group. After finding such a rule, the hypercluster router 118 extracts the hypercluster action code (if any), and places that information in the hypercluster actions queue 122. The hypercluster actions handler 124 subsequently retrieves the hypercluster action code from the queue, and converts it to a local action code, which is an action code in a format understood by local cluster manager 50. The local action code is captured by local cluster manager 50, and implements that action. This action can likewise be either starting the node or stopping the node. There may be a platform-specific plugin 126, which facilitates this capture of the local action code.

A third type of input is an update to the hyperclusters rules list 120. Such updates may originate from a local node, where a system administrator makes changes to the list locally. It may also originate from a remote node, where a change made from that remote node is being propagated to the local node. The details of these update procedures will not be discussed in turn. It should be noted here that in each hypercluster manager, there is a different version of the hypercluster rules list 120. Only rules affecting the node on which it resides are in the list.

A system administrator may locally modify the hypercluster rules list 120. A Java user interface 134 is a client application running on a separate computer but is on the same physical network as the local node. The application receives configuration and rules changes from the system administrator, and transmits it to a Java listener/server 136. A rules propagator/verifier 530 receives the updates, confirms that the update maintains the integrity and syntactical correctness of the hypercluster rules list 120, and writes those updates. Additionally, if the updates affect the rules on any other node, the new or changed rule is transmitted to those nodes via the hypercluster protocol 130. As an example, the system administrator creates a rule that starts a remote resource when the local resource is stopped. The change is made to local version of the hypercluster rules list 120, and the rules propagator and verifier 138 places the change in a hypercluster protocol 130 message destined for the nodes that are part of the remote resource. The tokenized view synchronicity protocol is used to ensure that multiple conflicting changes to the rules are propagated.

A remote node can also make changes to a local rule. A message in accordance with the hypercluster protocol is received by the Java listener/server component 136, and examines the message to determine that it is a rule. The change is then sent to the rules propagator/verifier 138, which, in turn, modifies the hypercluster rules list 120 to reflect the same.

6. Use Cases and the Hypercluster Manager

Further details pertaining to the processing of various data by the Hypercluster manager 52 in the aforementioned use cases a-e will now be described.

a. A single node in any of the clusters fails, but the system is operational and there are no dependencies defined between the application on the failed node and other applications in other clusters. Upon a failure of the first Windows node 80, the cluster manager 50b on the second Windows node 82 recognizes the node failure event. The aforementioned exit program transmits to the hypercluster manager 52b the local cluster event 112 to the event translator 110. The event translator 110 converts the local cluster event 112 to a Hypercluster event identifier with the event translation table 114. The translated Hypercluster event identifier is stored in the local events queue 116, and is further processed by the Hypercluster router 118. The Hypercluster router 118 verifies the Hypercluster rules list 120 and determines that no dependencies exist on the failover of the Windows cluster 78. An appropriate response as dictated by the Hypercluster rules list 120 is transmitted to the hypercluster actions queue 122. The response is processed by the Hypercluster actions handler 124, which sends a message back to the local cluster manager 50, 50b that it may proceed without dependencies. As indicated above, the exit program called to communicate with the local cluster manager 50 is defined in the VISION_CPML.DTD file of Appendix B. Additional parameters needed to send responses to the particular cluster manager 50 is also defined therein. Thereafter, the cluster manager 50*b* of the second Windows node 82*a* proceeds with the switchover.

b. A single node fails, with dependencies to another node, but that single node is completely offline and unable to communicate with any other node. As explained above, the first Windows node 80 may fail, and dependency rules dictate that the web server 104*a* runs off of a database application 106*a*, and that the web server 104*b* runs off of a database application 106*b*. Upon detecting the failure in the first Windows node 80, the cluster manager 50*b* in the second Windows node 82 forwards that local cluster event 112 to the event translator 110. The event translator 110 references the event translator table 114 to determine the Hypercluster event identifier, which is stored in the local events queue 116. Thereafter, the Hypercluster router receives the hypercluster event identifier, and based upon the Hypercluster rules list 120, it is determined that a dependency exists between the second i5/OS cluster 70.

The appropriate local node response of transferring the web server 104*a* to the web server 104*b* on the second Windows node 82 is also determined from the processing of the Hypercluster rules list 120, and placed in the hypercluster actions queue 122. Because it is specified that the database application 106*b* must be available prior to initiating the second Windows node 82, the local node response in the hypercluster actions queue 122 is suspended momentarily until the availability of the database application 106*b* on the fourth i5/OS node 74 is confirmed.

The appropriate response in the third and fourth i5/OS nodes 72, 74 is stored in the outgoing hypercluster events queue 133, and transmitted to the hypercluster managers 52*c* and 52*d* of the third and fourth i5/OS nodes 72, 74, respectively. The switchover within the second i5/OS cluster 70 is performed. Upon completion of these actions, a token is transmitted back to the Hypercluster manager 52*b* of the second Windows node 82, serving as the confirmation of availability of database application 106*b*. More specifically, the token is retrieved by the Hypercluster events dispatcher agent 128, queued in the incoming hypercluster events queue, and processed by the Hypercluster router 118. Recognizing that the previous operation was suspended pending receipt of the token, the Hypercluster router 118 instructs the hypercluster actions handler 124 to continue with the above-described local node response. Such instructions are processed by the Hypercluster platform-specific plugin 126, and performed by the cluster manager 50, 50*b*.

c. A resource provided by a cluster is manually ended for maintenance, with dependencies defined between the resource and the nodes in the cluster. For example, the third and fourth i5/OS nodes 72, 74 may include a switched disk 108, with the web servers 104*a,b* dependent upon the same. When the third i5/OS node 72 is ended for maintenance, the cluster manager 50*c* initiates an exit program, thereby generating the local cluster event 112 in the Hypercluster manager 52*c*. The local cluster event 112 is forwarded to the event translator 110, where it is translated to a Hypercluster event identifier by referencing the event translation table 114. The Hypercluster event identifier is temporarily stored in the local events queue 116, and is processed by the Hypercluster router 118. The Hypercluster router 118 processes the Hypercluster rules list 120, which includes a rule that Windows cluster 78 is dependent on the availably of the second i5/OS cluster 70. Additionally, the rule states that the database application 106 must be available before the Windows cluster 78 is switched over. An instruction directing the first Windows node 80 to shut down is stored in the outgoing Hypercluster events queue 133 and transmitted to the Hypercluster manager 52*a* via the Hypercluster events dispatcher agent 128.

The first Windows node is shut down, and a confirmation is transmitted back to the Hypercluster manager 52*c* of the third i5/OS node 72. Upon receiving this confirmation, the Hypercluster router 118 generates instructions to the cluster manager 50*c* to shut down the third i5/OS node 72, and also instructs the Hypercluster manager 52*d* to switch over. After the takeover is complete, the Hypercluster manager 52*d* transmits a message to the hypercluster manager 52*b* that the fourth i5/OS node 74, specifically the database application 106*b* thereon, is active. The cluster manager 50*b* on the second Windows node 82 is then activated.

d. An entire cluster fails, resulting in a separate cluster assuming responsibility. By way of the example above, the first i5/OS cluster 62 may take over upon failure of the second i5/OS cluster 64, that is, when both the third i5/OS node 72 and the fourth i5/OS node 74 fail. No event is triggered at this point because each cluster is responsible for heartbeating and sending its status to the Hypercluster 52. Next, a dependent resource, for example, the web server 104*a, b* of Windows CRG 84, fires an application failure event because it cannot communicate with the downed second i5/OS CRG 76. This event is transmitted to each of the remaining Hypercluster managers 52*a*, 52*b*, 52*e*, 52*f*, 52*g*, and 52*h*, while being of particular interest to the Hypercluster managers 52*g* and 52*h*. Turning to FIG. 5, the event is received by the Hypercluster event dispatcher agent 128, and queued in the incoming Hypercluster events queue 132 for processing by the Hypercluster router 118. The Hypercluster router 118 consults the Hypercluster rules list 120 to determine that the Windows CRG 84 is dependent upon the second i5/OS CRG 76, and that the dependency may be switched over to the first i5/OS CRG 68.

An instruction to activate the first i5/OS CRG 68 is stored in the Hypercluster actions queue 122, which is processed by the Hypercluster actions handler 124. The particular instructions to activate the first i5/OS node 64 and the second i5/OS node 66 (as both comprising the first i5/OS CRG 68) are relayed to the cluster manager 50*g*, 50*h*, via the respective instance of the platform specific plugin 126. Where an immediate start is desired, no further action is necessary. Where a delayed start is desired, however, the Hypercluster router 118 is directed to wait for a confirmation from the local cluster manager 50*g*, 50*h* that the first and second i5/OS nodes 64, 66 are indeed activated. Generally, the cluster manager 50 provides this upon activation, and is stored in the local cluster events 112. The event translator 110 consults the event translation table 114, and the activation is detected by the Hypercluster router 118. At this point, the Hypercluster manager 50 is aware of the fact that the first i5/OS CRG 68 is active. It is contemplated that the in addition to a notification that the first i5/OS node 64 is active, an IP address thereof may also be communicated to the Windows CRG 84 via the Hypercluster events dispatcher agent 128. Upon receipt by the Windows CRG 84, the dependent database application has been fully switched over to the first i5/OS CRG 68.

e. Manual switchover initiated on one node, where the node has a dependency with another cluster. As described above, a manual switchover may be initiated between the first Linux node 56 and the second Linux node 58, where both have dependencies to the i5/OS cluster 62. The first node to receive the action will receive a Hypercluster token. When the second Linux node 58 receives the Hypercluster token, it will initiate a switchover via the exit program associated with the cluster manager 50*e*. This exit program is contemplated to forward the action to the event translator 110 to translate the switchover action. This will then be sent to the Hypercluster router 118, which will determine that the first and second i5/OS nodes 64 and 66 have a co-residency requirement defined with respect to the Linux nodes 56 and 58. That is, if Linux is running on the first Linux node 30, the node 64 is set as primary. The same is true for the second Linux node 58 and the second i5/OS node 66. In addition, the relationship specifies that the first and second i5/OS nodes 64, 66 must be available before the first and second Linux nodes 56, 58 so that the evoked switchover on the i5/OS CRG 68 is complete before the Linux CRG 60 is completed.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

APPENDIX A

Hypercluster Rules (HC_RULES.DTD)

```
<!--DTD for HyperCluster, Copyright (C) 2002 Vision Solutions, Inc
HCGroup is a logical representation of the groups native to each cluster
service. For example, an HCGroup would be listed here for each MSCS
Resource Group that was to participate in the Hyper Cluster-->
<!ELEMENT HyperCluster (Communication, SiteList, GroupList,
        EventList, ActionList, RuleList)>
<!ATTLIST HyperCluster
    Name CDATA #REQUIRED
    Version CDATA #REQUIRED>
<!ELEMENT Communication (#PCDATA)>
<!ATTLIST Communication
    Protocol (UDP | TCP) #REQUIRED
    Port CDATA #REQUIRED>
```

APPENDIX A-continued

Hypercluster Rules (HC_RULES.DTD)

```
<!ELEMENT SiteList (Site+)>
<!ELEMENT Site (Node+)>
<!ATTLIST Site
    ID CDATA #REQUIRED>
<!ELEMENT Node (#PCDATA)>
<!ATTLIST Node
    Name CDATA #REQUIRED
    Address CDATA #REQUIRED
    CRGName CDATA #REQUIRED
    Certificate CDATA #REQUIRED>
<!ELEMENT GroupList (HyperGroup+)>
<!ELEMENT HyperGroup (#PCDATA)>
<!ATTLIST HyperGroup
    ID CDATA #REQUIRED
    CRGName CDATA #REQUIRED
    SiteList CDATA #REQUIRED>
<!ELEMENT EventList (Event+)>
<!ELEMENT Event (#PCDATA)>
<!ATTLIST Event
    ID CDATA #REQUIRED
    SiteID CDATA #REQUIRED
    HyperGroupID CDATA #REQUIRED
    EventName (START | STOP | STARTED | STOPPED)
        #REQUIRED>
<!ELEMENT ActionList (Action+)>
<!ELEMENT Action (#PCDATA)>
<!ATTLIST Action
    ID CDATA #REQUIRED
    SiteID CDATA #REQUIRED
    HyperGroupID CDATA #REQUIRED
    ActionName (START | STOP) #REQUIRED>
<!ELEMENT RuleList (Rule+)>
<!ELEMENT Rule (#PCDATA)>
<!ATTLIST Rule
    EventID CDATA #REQUIRED
    SiteID CDATA #REQUIRED
    HyperGroupID CDATA #REQUIRED
    Residency (COLOCATE) "COLOCATE"
    Wait CDATA #REQUIRED
    Timeout CDATA "0"
    Retries CDATA "0"
    ActionID CDATA #REQUIRED>
```

APPENDIX B

Exit/Meta Rules (VISION_CPML.DTD)

```
<!-- DTD for Cluster Proven Markup Language -->
<!-- Cluster Configuration Definitions and Attributes ================ -->
<!ELEMENT VisionConfiguration (#PCDATA | Cluster)*>
<!ATTLIST VisionConfiguration
    Name CDATA "Vision Clustering"
    Description CDATA "Vision Configuration">
<!ELEMENT Name ANY>
<!ELEMENT Description ANY>
<!ELEMENT Cluster (#PCDATA | RecovDomainId | NodeId)*>
<!ATTLIST Cluster
    Name CDATA " "
    Description CDATA " "
    ClusterTypes (OS400 | UNIX | HETEROGENEOUS) "UNIX">
<!ELEMENT RecovDomainId (#PCDATA | RecovDomainType | NodeId | LinkId |
        ServiceId | Heartbeat | EventList | ResourceId |
        ExitPgm)*>
<!ATTLIST RecovDomainId
    Description CDATA " "
    TakeoverIp CDATA "000.000.000.000"
    RecovDomainType (SWDEVICE | MIRRORDEVICE | REPLICATED |
        APPLICATION) "SWDEVICE">
<!-- ================ Recovery Domain Type and Attribute ============ -->
<!-- Node Definitions ================================================ -->
<!ELEMENT NodeId (#PCDATA)>
<!ATTLIST NodeId
    DefaultRole (Primary | Backup | Replica) "Primary"
    Name CDATA " "
    Description CDATA " "
```

APPENDIX B-continued

Exit/Meta Rules (VISION_CPML.DTD)

```
    CurrRole (Primary | Backup | Replica) "Primary"
    NodeOs (SOLARIS_SPARC | SOLARIS_X86 | LINUX |
        OS400) "SOLARIS_SPARC"
    NodeHW (SPARC | X86 | ISERIES | RS6000) "SPARC"
    Priority CDATA "1"
    Address CDATA "000.000.000.000">
<!-- Cluster Proven Definitions ===================================== -->
<!ELEMENT CppAction (#PCDATA)>
<!ATTLIST CppAction
    Actions (START | STOP | RESTART | WAIT | VERIFY) "START">
<!ELEMENT CppPacket (#PCDATA | CppAction)*>
<!ATTLIST CppPacket
    Name CDATA " "
    Description CDATA " ">
<!-- Cluster Event Definitions ===================================== -->
<!ELEMENT EventList (#PCDATA | CppPacket | EventId)*>
<!ATTLIST EventList
    Description CDATA " ">
<!ELEMENT EventId (#PCDATA | EventCode | ExitPgm | ExitProcedure | CppAction)*>
<!ATTLIST EventId
    Description CDATA " ">
<!ELEMENT EventCode (#PCDATA)>
<!ATTLIST EventCode
    Types (FAIL | END | SWITCH | RESTART | START | INITIALIZE) "SWITCH">
<!ELEMENT ExitPgm (#PCDATA | ExitProcedure)*>
<!ATTLIST ExitPgm
    Name CDATA " "
    Path CDATA "\"
    Description CDATA " ">
<!ELEMENT ExitProcedure (#PCDATA | ExitParameter)*>
<!ATTLIST ExitProcedure
    Name CDATA " "
    Description CDATA " ">
<!ELEMENT ExitParameter (PCDATA)>
<!ATTLIST ExitParameter
    Sequence CDATA "1"
    Description CDATA " "
    type (INT | CHAR) "INT">
<!-- Heartbeat Definitions ======================================= -->
<!ELEMENT Heartbeat (#PCDATA)>
<!ATTLIST Heartbeat
    HBType (COMM | SERIAL | DISK | APPLIC) "COMM"
    Wait CDATA "5">
<!-- Register Interested Elements =================================== -->
<!ELEMENT InterestedElement ANY>
<!-- Replication Link Definitions =================================== -->
<!ELEMENT LinkId (#PCDATA | LinkProtocol | SourceNode | TargetNode)*>
<!ATTLIST LinkId
    Description CDATA " "
    Protocol (TCPIP | SNA | Opticonnect | SERIAL) "TCPIP"
    SourceNode CDATA " "
    TargetNode CDATA " "
    MessageQueue CDATA " ">
<!-- Resource Definitions ========================================= -->
<!ELEMENT ResourceId (#PCDATA | EventList | ResourceParent | ResourceType |
        ResourceDetail)*>
<!ATTLIST ResourceId
    Name CDATA " ">
<!ELEMENT ResourceDetail (Disk | Application | Replication | Database)*>
<!ELEMENT ResourceParent (ResourceId*)>
<!ELEMENT ResourceType (#PCDATA)>
<!ATTLIST ResourceType
    types (DEVICE | DATABASE | APPLIC) "APPLIC">
<!ELEMENT Application ANY>
<!ELEMENT Mirror ANY>
<!ELEMENT Disk (#PCDATA)>
<!ATTLIST Disk
    Name CDATA "DefaultDisk"
    DiskType (SCSI | NAS | FIBERCHAN) "SCSI"
    MountPoint CDATA " "
    DiskResource CDATA " "
    FileSystem (SUN | VERITAS | NFS | OS400) "SUN">
<!ELEMENT Replication (#PCDATA | ServiceId | ObjectList)*>
<!ATTLIST Replication
    Type (RecordLv1 | ODBC | ObjectEvent | ObjectPoll |
    ObjectJrnl) "RecordLv1">
<!ELEMENT Database (#PCDATA | ServiceId | ObjectList)*>
<!ATTLIST Database
```

APPENDIX B-continued

Exit/Meta Rules (VISION_CPML.DTD)

```
    Name (DB2 | ORACLE | SYBASE | INFORMIX | GENERIC) "GENERIC"
    MountPoint CDATA " "
    DiskResource CDATA " "
    FileSystem (SUN | VERITAS | NFS | OS400) "SUN">
<!ELEMENT SelectionFile (#PCDATA | ObjectList)*>
<!ATTLIST SelectionFile
    Name CDATA "DefaultFile"
    Description CDATA " "
    FilePath CDATA "\"
    FileObject CDATA "VisionSel">
<!ELEMENT ObjectList (#PCDATA | ObjectRule)*>
<!ATTLIST ObjectList
    ListName CDATA "DefaultList"
    ListDescription CDATA " "
    ListPath CDATA "\"
    ListObject CDATA "*ALL">
<!ELEMENT ObjectRule (#PCDATA)>
<!ATTLIST ObjectRule
    RuleName CDATA "DefaultRule"
    RuleDescription CDATA " "
    RulePath CDATA "\"
    RuleObject CDATA "*ALL">
<!-- Service Definitions ================================================== -->
<!ELEMENT ServiceId (#PCDATA | ResourceId)*>
<!ATTLIST ServiceId
    Description CDATA " "
    type (SYSTEM | DATABASE | APPLICATION | MIRRORING) "APPLICATION">
```

APPENDIX C

Translator Rules (TRANSLATOR_RULES.DTD)

```
<!ELEMENT ROOT (List_Port, PLAT_MSG+)>
<!ELEMENT List_Port (#PCDATA)>
<!ELEMENT PLAT_MSG (Platform, OSVersion, Clustersw,
        MsgAttr, EventMapping+)>
<!ELEMENT Platform (#PCDATA)>
<!ELEMENT OSVersion (#PCDATA)>
<!ELEMENT MsgAttr (#PCDATA)>
<!ELEMENT Clustersw (#PCDATA)>
<!ELEMENT EventMapping (#PCDATA)>
<!ATTLIST List_Port
    Number CDATA #REQUIRED>
<!ATTLIST Platform
    Id (OS400 | Linux | Windows | AiX | UNIX) #REQUIRED>
<!ATTLIST OSVersion
    Version CDATA #REQUIRED>
<!ATTLIST EventMapping
    SrcEvent CDATA #REQUIRED
    SrcState CDATA #REQUIRED
    SrcDesc CDATA #REQUIRED
    TgtEvent CDATA #REQUIRED
    TgtState CDATA #REQUIRED
    TgtDesc CDATA #REQUIRED
    EventActionClass CDATA #REQUIRED>
<!ATTLIST MsgAttr
    Language (UDP | TCP) #REQUIRED
    CharSet (EBCDIC | ASCII) #REQUIRED
    Endian (BIG | LITTLE) #REQUIRED
    Format (Plain | XML | HTML) #REQUIRED
    TranslationClass CDATA #REQUIRED
    ActionClass CDATA #REQUIRED
    TranslationXSL CDATA #REQUIRED>
<!ATTLIST Clustersw
    Name (Orion | Windows | OS400) #REQUIRED>
```

What is claimed is:

1. A method for coordinating availability of data processing resources between a first cluster of nodes each controlled by a respective first cluster manager and multiple other clusters of nodes each controlled by a respective second cluster manager, the method comprising:

receiving a disruption signal from an exit program of one of the first cluster managers, the disruption signal being representative of a disruption event associated with a specific one of the nodes of the first cluster, the disruption signal being received by a first hypercluster manager of the specific one of the nodes of the first cluster;

deriving a local action code and a hypercluster event code from a hypercluster rules list, the local action code and the hypercluster event code corresponding to the disruption event, the local action code having an associated local cluster activation sequence for regulating the operation of the first cluster of nodes, and the hypercluster event code having an associated cluster activation sequence for regulating the operation of the respective multiple other clusters of nodes;

transmitting the hypercluster event code to the multiple other clusters of nodes, each of the nodes of the multiple other clusters of nodes including a second hypercluster manager for execution of a remote cluster activation sequence thereon;

receiving a token on the first hypercluster manager transmitted thereto in response to a completed execution of the remote cluster activation sequence on a one of the node of the multiple other clusters of nodes; and executing the local cluster activation sequence on the first cluster of nodes upon receipt of the token;

wherein the first cluster of nodes and the multiple other clusters of nodes each function independent of each other, the nodes of the first cluster of nodes communicate with each other by a first set of messages, and the nodes of a given one of the multiple other clusters of nodes communicate with each other by a second set of messages.

2. The method of claim 1, further comprising:

synchronizing views of the first and the multiple other clusters of nodes amongst each of the first and the multiple other clusters, view synchrony being determined by another token.

3. The method of claim 2, wherein deriving the hypercluster event code includes:

translating the disruption event to a universal event code with a translation table, the translation table including a first sequence of disruption events and a second sequence of universal event codes correlated thereto.

4. The method of claim 3, wherein the universal event code is referenced to derive the hypercluster event code from the hypercluster rules list.

5. The method of claim 2, wherein the local and remote cluster activation sequences include dependencies therebetween, the dependencies establishing the timing and order of the local and remote cluster activation sequences.

6. The method of claim 5, wherein transmitting the hypercluster event code to the other clusters of nodes is in response to receiving a confirmation code representative of completion of one step in the cluster activation sequence as defined by the dependencies.

7. The method of claim 2, wherein the remote cluster activation sequence is being executed on one of the nodes of the multiple other clusters.

* * * * *